(12) United States Patent
Shin et al.

(10) Patent No.: US 12,045,933 B2
(45) Date of Patent: Jul. 23, 2024

(54) SYSTEM AND METHOD FOR SIMULATING LIGHT-IN-FLIGHT

(71) Applicant: GOOGLE LLC, Mountain View, CA (US)

(72) Inventors: Dongeek Shin, Santa Clara, CA (US); Steven Benjamin Goldberg, Los Altos Hills, CA (US)

(73) Assignee: GOOGLE LLC, Mountain View, CA (US)

( * ) Notice: Subject to any disclaimer, the term of this patent is extended or adjusted under 35 U.S.C. 154(b) by 56 days.

(21) Appl. No.: 17/574,881

(22) Filed: Jan. 13, 2022

(65) Prior Publication Data

US 2022/0230384 A1 Jul. 21, 2022

Related U.S. Application Data

(63) Continuation of application No. PCT/US2021/013645, filed on Jan. 15, 2021.

(51) Int. Cl.
*G06T 15/50* (2011.01)
*G06T 3/02* (2024.01)
*G06T 7/50* (2017.01)
*G06T 7/70* (2017.01)
*G06T 11/00* (2006.01)

(52) U.S. Cl.
CPC .............. *G06T 15/506* (2013.01); *G06T 3/02* (2024.01); *G06T 7/50* (2017.01); *G06T 7/70* (2017.01); *G06T 11/00* (2013.01); *G06T 2200/21* (2013.01); *G06T 2207/10028* (2013.01)

(58) Field of Classification Search
CPC ......... G06T 15/1506; G06T 7/50; G06T 7/70; G06T 3/0006; G06T 2207/10028; G06T 2200/21; G06T 11/00; G06T 3/02
USPC .............................................................. 345/9
See application file for complete search history.

(56) References Cited

U.S. PATENT DOCUMENTS 8,022,344 B2 * 9/2011 Tsuboi ................... G02B 26/06
359/9
9,165,367 B2 * 10/2015 Kim ........................ G06T 7/529
9,979,894 B1 * 5/2018 Kokemohr ............ G06T 11/001
(Continued)

OTHER PUBLICATIONS

International Search Report and Written Opinion mailed Oct. 13, 2021 for corresponding International Application No. PCT/US021/013645, 14 pages.
(Continued)

*Primary Examiner* — Tom V Sheng

(57) ABSTRACT

Systems and methods related to simulated light-in-flight imaging are described. A computing device may execute a light-in-flight engine to process an optical image and a corresponding depth map to produce a light-in-flight image or video that simulates propagation of a wavefront across a scene. The light-in-flight engine may generate an optical simulation output by transforming a depth map to a three-dimensional lift domain to produce a three-dimensional data structure, then convolving the three-dimensional data structure with a convolutional operator, which may define a Gaussian sphere, to produce a filtered three-dimensional data structure. The light-in-flight engine then affine transforms the optical image with an identified slice of the filtered three-dimensional data structure to produce a light-in-flight image.

22 Claims, 7 Drawing Sheets

(56) References Cited

U.S. PATENT DOCUMENTS

| | | | | |
|---|---|---|---|---|
| 11,227,366 | B2* | 1/2022 | Othon | B60R 1/00 |
| 11,315,291 | B1* | 4/2022 | Armand | G06F 18/00 |
| 2014/0327750 | A1* | 11/2014 | Malachowsky | H04N 23/63 |
| | | | | 348/61 |
| 2017/0070673 | A1* | 3/2017 | Lelescu | G06T 7/20 |
| 2017/0091910 | A1* | 3/2017 | Surazhsky | H04N 9/3179 |
| 2018/0061018 | A1* | 3/2018 | Ahn | G06T 5/003 |
| 2018/0262671 | A1* | 9/2018 | Kokemohr | G06T 5/008 |
| 2019/0212415 | A1* | 7/2019 | Chiu | G01S 7/4808 |
| 2020/0007850 | A1 | 1/2020 | Nieuwenhove et al. | |
| 2020/0351454 | A1* | 11/2020 | Wu | H04N 23/11 |
| 2022/0006998 | A1* | 1/2022 | Busam | G06T 5/50 |
| 2022/0180484 | A1* | 6/2022 | Jia | G06T 5/20 |

OTHER PUBLICATIONS

Kaplanyan, "Simulated Femto-Photography: Virtual Femtosecond Camera-Scene: Cornell Box", https : //cgg.mff.cuni. z/~jaroslav/papers/2013-Itscourse/06%20-%20Itscourse%20-%20femtosecond%20-%20kaplanyan%20-%20video.mp4, Jul. 21, 2013, 1 page.

O'Toole et al. "Reconstructing Transient Images from Single-Photon Sensors", 2017 IEEE Conference on Computer Vision and Pattern Recognition (CVPR), Jul. 21-26, 2017, 9 pages.

Jarabo et al. "A Framework for Transient Rendering", https://dl.acm.org/doi/10.1145/2661229.2661251, ACM Transactions on Graphics, 33, 6, Nov. 2014, 10 pages.

Keller et al., "Real-Time Simulation of Time-of-Flight Sensors", Simulation Modelling Practice and Theory 17 Elsevier, Amsterdam, NL, vol. 17, No. 5, May 2009, 12 pages.

Bulczak et al. "Efficient Subsurface Scattering Simulation for Time-of-Flight Sensors", https://diglib.eg.org/handle/10.2312/vmv20181259, Computer Graphics Group, Institute for Vision and Graphics (IVG), University of Siegen, Germany , Vision, Modeling, and Visualization (2018), 7 pages.

Kakue et al., "Digital Light-in-Flight Recording by Holography by Use of a Femtosecond Pulsed Laser", IEEE Journal of Selected Topic in Quantum Electronics. vol. 18. No. 1, Jan./Feb. 2012, 7 pages.

Kakue et al., "Hologram Calculation of Light-in-flight Recording by Holography based on Numerical Simulation Model with FDTD Method", https://confit.atlas.jp/guide/event-img/idw2019/3Dp1_3DSAp1-13/public/pdf_archive?type=in, The 26th International Display Workshops, Nov. 27-29, 2019, 4 pages.

Zheng et al., "Computational 4D imaging of light-in-flight with relativistic effects", https://doi.org/10.1364/PRJ.390417, Photonics Research, vol. 8, No. 7, Jul. 2020, 7 pages.

Du et al., "DepthLab: Real-time 3D Interaction with Depth Maps for Mobile Augmented Reality", https://www.duruofei.com/papers/Du_DepthLab-Real-Time3DInteractionWithDepthMapsForMobileAugmentedReality_UIST2020_lowres.pdf, UIST 2020, Oct. 20-23, 2020, 15 pages.

Maru Studio, "Spark AR Tutorial: Create Filter Effect With Face Mesh, Retouching And Lighting Effect", https://www.youtube.com/watch?v=RapfrXtyliU, May 10, 2019, 1 page.

International Preliminary Report on Patentability mailed Jul. 27, 2023 for corresponding International Application No. PCT/US021/013645, 7 pages.

* cited by examiner

SYSTEM AND METHOD FOR SIMULATING LIGHT-IN-FLIGHT

CROSS-REFERENCE TO RELATED APPLICATIONS

The present application is a Continuation of International Patent Application Serial No. PCT/US2021/013645, entitled "SYSTEM AND METHOD FOR SIMULATING LIGHT-IN-FLIGHT" and filed on 15 Jan. 2021, the entireties of which is incorporated by reference herein.

BACKGROUND

Conventional affordable camera systems are only capable of capturing a still optical image of a scene. Such conventional systems cannot capture the complex path of light packets as they travel through space and bounce off of objects in a given scene, and therefore cannot capture images or videos that depict such light packets in motion across such a scene. The concept of capturing images of the paths taken by light packets as they move across objects in a scene is sometimes referred to as "light-in-flight" imaging. For a conventional camera system to perform light-in-flight imaging, the system would require sensitive time-tagging hardware that is relatively expensive and further require ultra-sensitive cameras operating at a trillion frames per second. Accordingly, the hardware required for light-in-flight imaging is not readily able to be commercialized due to these costs and equipment complexities.

SUMMARY

In an example, a method comprising:
generating an optical simulation output that simulates light scattering effects for a simulated wavefront based on a depth map that corresponds to an optical image; and
producing a light-in-flight image by adjusting brightnesses of a subset of pixels of the optical image based on the optical simulation output and based on a location of the simulated wavefront at a time corresponding to a defined timestamp.

According to further examples, the method may comprise one or more (e.g., all) of the following features (or any combination thereof).

Generating the optical simulation output may comprise: generating a three-dimensional data structure based on the depth map; and
convolving the three-dimensional data structure with a convolutional operator to generate a filtered three-dimensional data structure.

Generating the three-dimensional data structure may comprise:
for a given pixel of the depth map, mapping the given pixel to a respective location of the three-dimensional data structure based on two-dimensional coordinates of the given pixel in the depth map and based on a depth value associated with the given pixel.

The convolutional operator may define a Gaussian sphere.

The method may further comprise:
identifying a slice comprising a subset of voxels of the filtered three-dimensional data structure centered at a wavefront depth corresponding to the location of the simulated wavefront at the time corresponding to the defined timestamp.

Adjusting the brightnesses of the subset of pixels of the optical image based on the optical simulation output may comprise:
performing an affine-transform of the optical image with the identified slice.

The method may further comprise:
determining the wavefront depth based on the speed of light and based on the time corresponding to the defined timestamp, wherein the wavefront depth is indicative of the location of simulated wavefront in the optical image at the time corresponding to the defined timestamp.

In another example, a mobile device comprising:
an optical camera configured to capture an optical image;
a depth camera configured to capture a depth map corresponding to the optical image;
at least one processor configured to:
generate an optical simulation output that simulates light scattering effects for a simulated wavefront based on the depth map; and
adjust brightnesses of a subset of pixels of the optical image based on the optical simulation output and based on a location of the simulated wavefront at a time corresponding to a defined timestamp to produce a light-in-flight image.

According to further examples, the mobile device may comprise one or more (e.g., all) of the following features (or any combination thereof). The mobile device and/or the components comprised within the mobile device may be adapted to perform the following features.

To generate the optical simulation output, the processor may be further configured to:
generate a three-dimensional data structure based on the depth map; and
convolve the three-dimensional data structure with a convolutional operator to generate a filtered three-dimensional data structure, wherein the optical simulation output comprises the filtered three-dimensional data structure.

To generate the three-dimensional data structure, the processor may be configured to:
for a given pixel of the depth map, map the given pixel to a respective location of the three-dimensional data structure based on two-dimensional coordinates of the given pixel in the depth map and based on a depth value associated with the given pixel.

The convolutional operator may define a Gaussian sphere.

The processor may be configured to:
identify a slice comprising a subset of voxels of the filtered three-dimensional data structure centered at a wavefront depth corresponding to the location of the simulated wavefront at the time corresponding to the defined timestamp.

To adjust the brightnesses of the subset of pixels of the optical image based on the optical simulation output, the processor may be configured to:
affine-transforming the optical image with the identified slice to produce the light-in-flight image.

The processor may be further configured to:
determine the wavefront depth based on the speed of light and based on the time corresponding to the defined timestamp, wherein the wavefront depth is indicative of the location of the simulated wavefront in the optical image at the time corresponding to the defined timestamp.

In another example, a method comprising:
generating a plurality of light-in-flight image frames based on an optical image, a depth map corresponding to the optical image, and one or more timing parameters; and
assembling the plurality of light-in-flight image frames into a light-in-flight video, wherein the light-in-flight video simulates propagation of a wavefront of a light pulse across a scene depicted in the optical image.

According to further examples, the method may comprise one or more (e.g., all) of the following features (or any combination thereof).

Generating a light-in-flight image frame of the plurality of light-in-flight image frames may comprise:

generating a three-dimensional data structure based on the depth map;

convolving the three-dimensional data structure with a convolutional operator to generate a filtered three-dimensional data structure; and adjusting brightnesses of a subset of pixels of the optical image based on an optical simulation output to generate the light-in-flight image frame, wherein the optical simulation output comprises the filtered three-dimensional data structure.

Generating the three-dimensional data structure may comprise:

for a given pixel of the depth map, mapping the given pixel to a respective location of the three-dimensional data structure based on two-dimensional coordinates of the given pixel in the depth map and based on a depth value associated with the given pixel.

The convolutional operator may define a Gaussian sphere.

Generating the light-in-flight image frame of the plurality of light-in-flight image frames may further comprise:

identifying a slice comprising a subset of voxels of the filtered three-dimensional data structure centered at a wavefront depth corresponding to a location of the wavefront in the scene depicted in the optical image at a time corresponding to a defined timestamp.

Adjusting the brightnesses of the subset of pixels of the optical image based on the optical simulation output may comprise:

affine-transforming the identified slice with the optical simulation output to produce the light-in-flight image frame.

Generating the light-in-flight image frame of the plurality of light-in-flight image frames may further comprise:

determining the wavefront depth based on the speed of light and based on a time corresponding to the defined timestamp, wherein the wavefront depth is indicative of the location of the wavefront in the scene depicted in the optical image at the time corresponding to the defined timestamp.

In another example, a computer program product may have instructions stored thereon, the instructions, when executed by a processor, may cause the processor to perform the steps of a method as described herein.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
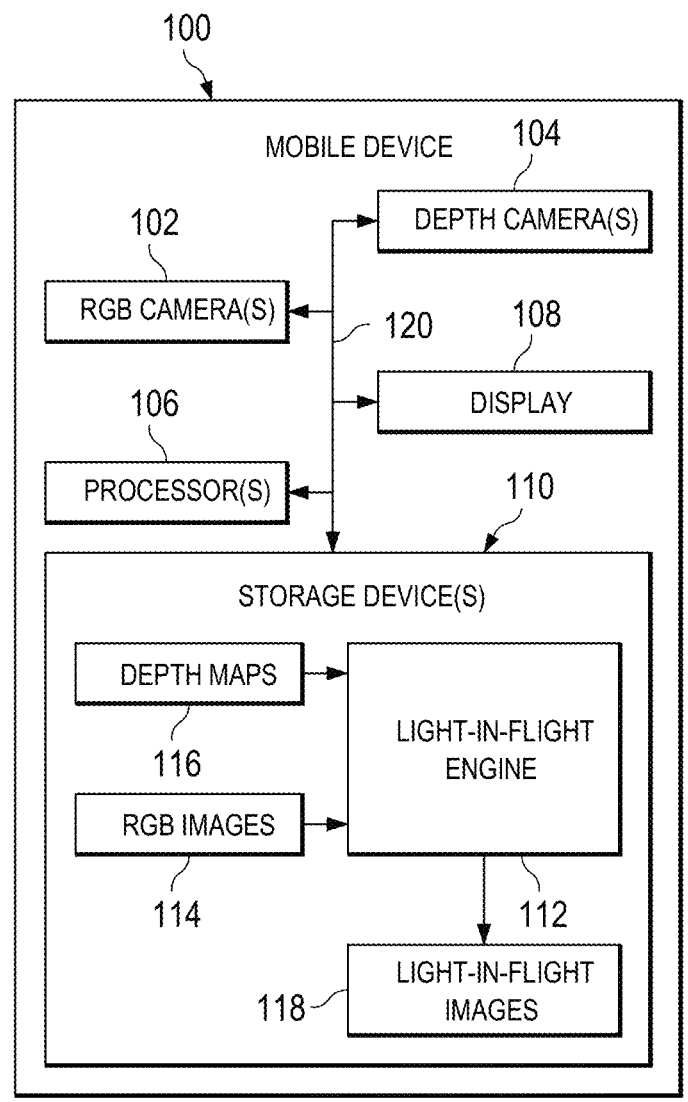
FIG. 1 is a block diagram of a mobile device that executes a light-in-flight engine in accordance with some embodiments.

Embodiments of the present disclosure provide systems and methods by which light-in-flight imaging can be simulated using the camera system of a smartphone or other device. For example, light-in-flight effects can be simulated using a light-in-flight image that employs a red-green-blue (RGB) image (sometimes referred to herein as an "optical image") and depth image (sometimes referred to herein as a "depth map") pair as inputs, which may respectively be captured using an RGB camera (sometimes referred to herein as an "optical camera") and a depth camera of a device such as a smart phone, tablet, pair of smart glasses, or another applicable device that includes such cameras.

In some embodiments, the device may simulate light-in-flight imaging of a wavefront corresponding to the simulated emission of a light pulse from the device or from an object (e.g., a light source) in an augmented reality (AR) scene. For example, when generating a light-in-flight image frame based on a captured RGB image, a light-in-flight engine calculates where the wavefront will be located in the scene depicted in the RGB image at a particular time based on depth information derived from a depth map corresponding to that RGB image, and based on timing parameters that define the timing of the movement of the wavefront over the scene, such as the speed at which the wavefront is to travel across the scene and/or the time period over which the wavefront is to travel across the scene. In some embodiments, to improve the perceptibility of the wavefront and to better simulate how the light packets of the wavefront would bounce off of the objects of the scene, the light-in-flight engine may transform the RGB image by generating an optical simulation of the wavefront, such as by applying a convolutional operator to wavefront pixels of the corresponding depth map, then affine-transforming the original RGB image with the output of the optical simulation to produce a light-in-flight image frame. Affine-transforming the original RGB image with the output of the optical simulation modifies the brightness of the wavefront pixels as well as pixels within a region of influence of the wavefront pixels in three-dimensional space, thus improving the perceptibility of the wavefront pixels.

In some embodiments, the optical simulation may be generated and applied to the original RGB image over multiple sequential timestamps in order to generate a light-in-flight video effect. For example, since the wavefront moves across a given scene over time, the light-in-flight engine may generate a sequence of light-in-flight image frames for multiple timestamps, such that the sequence of light-in-flight image frames depicts motion of the wavefront across the scene of the original RGB image. The light-in-flight engine may then assemble the sequence of light-in-flight image frames to produce a light-in-flight video or animated graphics interchange format (GIF) file, for example, which may be stored on a storage device (e.g., solid state drive, hard disk drive, flash drive, memory, etc.) included in or coupled to the device that executes that executes the light-in-flight engine.

Simulating light-in-flight imaging in this way enables various applications. For example, the light-in-flight engine may be used to apply a unique photo filter to captured images, allowing photographers to introduce novel simulated lighting to captured scenes. As another example, the light-in-flight engine may be applied in AR scenes to simulate the motion of light packets from a selected light source in such AR scenes, which may be desirable for its aesthetic visual effect or which may be used to teach students about the mechanics of light paths.

FIG. 1 is a block diagram illustrating a mobile device 100 that is configured to simulate light-in-flight imaging. As shown the mobile device 100 includes one or more RGB cameras 102 (sometimes referred to herein as "optical cameras 102"), one or more depth cameras 104, one or more processors 106, a display 108, and one or more storage devices 110. Each of components 102, 104, 106, 108, and 110 are coupled (physically, communicatively, and/or operatively) via communication channels 120. In some examples, the communication channels 120 may include a system bus, a network connection, an inter-process communication data structure, or any other method for communicating data.

The processor(s) 106 may be configured to implement functionality and/or process instructions for execution. For example, the processor(s) 106 may be capable of processing instructions stored on the storage device(s) 110. The processor(s) 106 may include any or each of a microprocessor, a controller, a digital signal processor (DSP), an application specific integrated circuit (ASIC), a field-programmable gate array (FPGA), or equivalent logic circuitry.

The storage device(s) 110 may be configured to store information within the mobile device 100 during operation. For example, in some embodiments, the storage device(s) 110 include one or more computer-readable storage media, computer-readable storage devices, temporary memory devices, and/or volatile memories such as random access memories (RAM), static random access memories (SRAM), dynamic random access memories (DRAM), or other applicable volatile memories. In some examples, the storage device(s) are used to store program instructions for execution by the processor(s) 106. In some examples, the storage device(s) may further include one or more non-volatile storage elements such as magnetic hard discs, optical discs, floppy discs, flash memories, or forms of electrically programmable memories (EPROM) or electrically erasable and programmable (EEPROM) memories. In some embodiments, the storage device(s) 110 are used by software or applications (e.g., the light-in-flight engine 112) running on the mobile device 100 to temporarily store information during program execution.

The RGB camera(s) 102 may include one or more cameras that include a standard image sensor through which visual (e.g., colored) images of scenes of persons and objects are acquired. Optical images captured by the RGB camera(s) 102 may be stored at the storage device(s) 110. Herein, optical images captured by an RGB camera such as the RGB camera(s) 102 may sometimes be referred to as "RGB images".

The depth camera(s) 104 may capture depth maps of a scene that define the distance between the mobile device 100 and some or all of the objects in the scene. In some embodiments, for each RGB image captured by the RGB camera(s) 102, the depth camera(s) 104 may capture a corresponding depth map. In some embodiments, the depth camera(s) 104 (sometimes referred to as "range cameras") may include one or more Time-of-Flight (ToF) depth cameras, which use pulsed light or continuous wave amplitude modulation to illuminate a scene with infrared light and measure the ToF of the infrared light. ToF may be characterized as the time period spanning the time at which infrared light is emitted from an infrared light source of the depth camera to the time at which the infrared light returns to an infrared light sensor of the depth camera after being reflected off of objects in the scene. It should be understood that other types of depth cameras, such as stereo triangulation cameras and coded aperture cameras, could additionally or alternatively be included in the depth camera(s) 104, according to various embodiments.

The mobile device 100 can include additional components that are not shown in FIG. 1 to reduce clutter. For example, the mobile device 100 can include a battery to provide power to the components of the mobile device 100.

In the example of FIG. 1, the storage device(s) 110 may store RGB images 114 captured by the RGB camera(s) 102 and depth maps 116 captured by the depth camera(s) 104. The storage device(s) 110 may include instructions for executing a light-in-flight engine 112 with the one or more processors 106. The light-in-flight engine 112 receives the RGB images 114 and corresponding depth maps 116 and generates light-in-flight images 118 based on the RGB images 114 and the depth maps 116. For example, for each of the RGB images 114, the light-in-flight engine 112 generates a sequence of light-in-flight images 118 depicting a wavefront moving across the scene of that RGB image. Herein, the terms "wavefront" or "simulated wavefront" generally correspond to the simulated emission of a short light pulse. In some embodiments, the light-in-flight engine 112 may simulate the emission of such a short light pulse from a source located at the depth camera(s) 104 or RGB cameras 102. In some embodiments, the light-in-flight engine 112 may simulate the emission of such a short light pulse from a source disposed at a location within the scene depicted in the RGB image or at a location outside of the scene. In some embodiments, the light-in-flight engine 112 may simulate the emission of such a short light pulse from a source at a location in an environment, which may correspond to a physical object in that environment or which may correspond to a virtual object that is associated with the location as part of an augmented reality scene or virtual reality scene.

When simulating light-in-flight imaging of a wavefront of a light pulse moving across the scene of one of the RGB images 114 over a given time period, the light-in-flight engine 112 is able to determine which pixels of the RGB image 114 and which pixels of the corresponding depth map 116 correspond to the depth of the wavefront at a given time following emission of a corresponding light pulse based on pixel depth information defined in the depth map 116. For example, like an RGB image, a depth map includes an array of pixels, each having a respective pixel value. However, rather than representing color values, each pixel of a depth map represents a respective depth value corresponding to the distance between the depth camera that captured the depth map and the portion of the scene (i.e., "object patch") to which that pixel corresponds.

Each depth value of the depth map is a function of the time that it takes for light to reach the depth camera multiplied by the speed of light (e.g., $d = c \cdot t$, where d is distance, c is the speed of light, and t is time). This means that the light-in-flight engine can determine the amount of time it would take for a wavefront to travel to a location corresponding to a specific depth within the scene based on the speed of light. Accordingly, when simulating a wavefront traveling across the scene of an RGB image, the light-in-flight engine 112 uses the corresponding depth map of the scene to determine the location of the wavefront in the scene at a given time following the simulated emission of the wavefront. That is, the pixels of the RGB image that correspond to the location of the wavefront at a given time during the wavefront's simulated traversal of the scene may be identified by the light-in-flight engine 112 based on the depth values of corresponding pixels of the depth map 116 associated with the RGB image 114.

In some embodiments, the light-in-flight engine 112 may determine, based on defined timing parameters stored in the storage devices 110, a time period over which the traversal of the wavefront across the scene in a given RGB image is to be simulated. In some embodiments, the light-in-flight engine 112 may generate timestamps corresponding to discrete times occurring within the determined time period, and may generate a respective light-in-flight image for each timestamp or for a subset of the timestamps. Herein, a "timestamp" refers to a record of a discrete time occurring during the time period over which propagation of a wavefront across a scene is simulated or is to be simulated. In some embodiments, the light-in-flight engine 112 may generate a light-in-flight video by assembling a sequence of the generated light-in-flight images (e.g., temporally sequential light-in-flight images).

Alternatively, in some embodiments, the light-in-flight engine 112 may generate a single light-in-flight image corresponding to a single timestamp within the determined time period, which may be defined in the timing parameters or via user input provided by the user of the mobile device 100. For example, it may be desirable to generate only one light-in-flight image from an RGB image at a defined timestamp in some photography applications. It should be understood that, in some embodiments, a computing device other than the mobile device that captured the RGB image and corresponding depth map may execute the light-in-flight engine 112 after receiving the RGB image and the depth map. Accordingly, embodiments of the light-in-flight engine described herein are not limited to execution by mobile devices or, specifically, the mobile device that captured the images being processed by the light-in-flight engine.

To visualize the location of the wavefront at a given time following wavefront emission, light-in-flight engine 112 may increase the brightness of each of the identified pixels (sometimes referred to herein as the "wavefront pixels") relative to the remaining pixels of the RGB image (sometimes referred to herein as the (non-wavefront pixels"), or may decrease the brightness of each of the non-wavefront pixels of the RGB image relative to the brightness of each of the wavefront pixels, depending on the desired effect.

Figure 2:
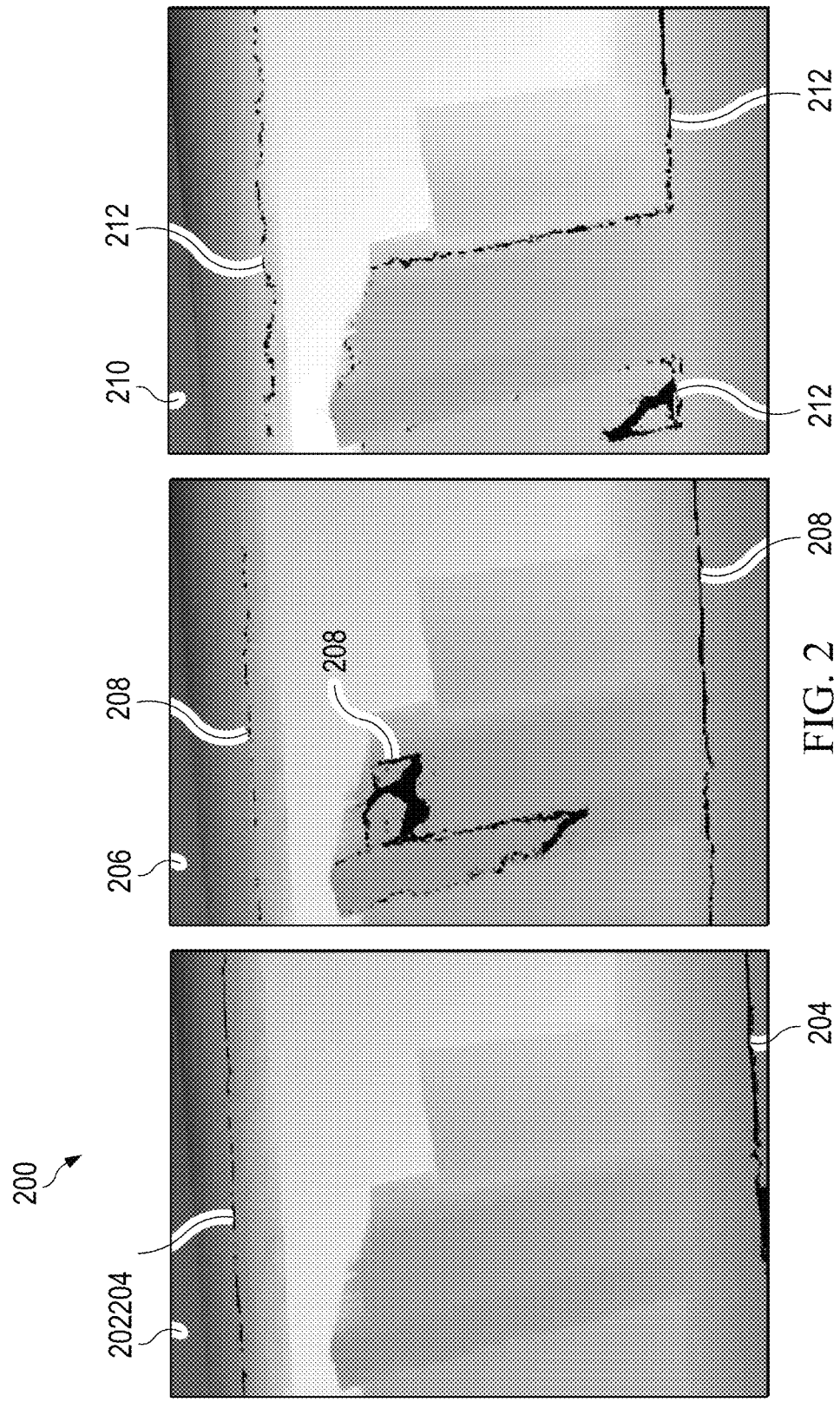
FIG. 2 is a sequence of depth images depicting the location of wavefront pixels corresponding to different timestamps as a wavefront travels across the scene depicted in the depth images, in accordance with some embodiments.

FIG. 2 depicts a sequence 200 of three different depth images corresponding to three different timestamps of a wavefront's simulated traversal across a scene, where each depth image indicates pixels within the scene corresponding to the simulated wavefront's location (e.g., depth) at a corresponding time. In the present example, the light-in-flight engine 112 simulates the wavefront as though it is a short pulse emitted from the mobile device that has captured the images and corresponding depth maps. The sequence 200 includes a first depth image 202 that corresponds to a first time and that includes a first set of wavefront pixels 204, a second depth image 206 that corresponds to a second time and that includes a second set of wavefront pixels 208, and a third depth image 210 that corresponds to a third time and that includes a third set of wavefront pixels 212, where the first time occurs before the second time, the second time occurs before the third time, and the first, second, and third times each occur during a time period in which the wavefront is simulated to traverse the scene depicted in the depth images 202, 206, and 210 and corresponding RGB images. In some embodiments, pixels of the depth images 202, 206, and 210 having lower pixel values correspond to objects that are nearer to the mobile device, while pixels having higher pixel values correspond to objects that are further away from the mobile device. That is, the value of each pixel of a given depth map 202, 206, 210 corresponds to that pixel's depth within the scene depicted in the depth map and that of the corresponding pixel in the corresponding RGB image. Accordingly, the pixel value of a pixel of a depth map may be referred to as a "depth value" herein. Pixels of the depth maps having the same pixel value are approximately the same distance away from the mobile device. It should be understood that the wavefront pixels 204, 208, and 212 have been darkened to improve their visibility and the depths of the wavefront pixels 204, 208, and 212 are, therefore, not indicated by their color or brightness shown in the illustration of FIG. 2.

To identify which pixels of the depth map are wavefront pixels at a given time, the light-in-flight engine 112 identifies a depth value corresponding to that time, and identifies all pixels in the depth map with the identified depth value as being wavefront pixels. In the present example, the wavefront pixels 204 are disposed closer to the mobile device than the wavefront pixels 208, which are disposed closer to the mobile device than the wavefront pixels 212, such that the wavefront is shown to move further away from the mobile device over time.

Returning to the example of FIG. 1, while in some embodiments the light-in-flight engine 112 may brighten only the identified wavefront pixels in each light-in-flight image, this brightening may be difficult to perceive, depending on the scene depicted in the original RGB image. Additionally, brightening only the identified wavefront pixels does not account for light scattering that may occur when the wavefront hits various objects within the scene, beam widening that occurs as the wavefront propagates across the scene, and light dispersion that occurs as the wavefront propagates across the scene. Accordingly, in some embodiments, the perceptibility of the simulated wavefront and the accuracy of the simulation may be improved, by simulating how the light packets of the wavefront are reflected or scattered off of the objects of the scene (i.e., light scattering) and simulating the effects of beam widening and light dispersion by applying a convolutional operator to the wavefront pixels. For example, the light-in-flight engine 112 may generate a light-in-flight image for an RGB image, simulating a pulse wavefront at a given timestamp, by generating an optical simulation of the wavefront and affine-transforming the original RGB image with the output of the optical simulation. When generating the optical simulation, the light-in-flight engine 112 may apply a convolutional operator to a three-dimensional transformation of the pixels of the depth map to produce a simulation output that approximates non-idealities of the wavefront's propagation across the scene. A slice of the simulation output centered at the wavefront depth for a given timestamp may then be affine-transformed with the original RGB image to produce a light-in-flight image frame. For example, the convolutional operator may approximate the effects of short light pulse scattering, beam widening, and light dispersion in space.

Figure 3:
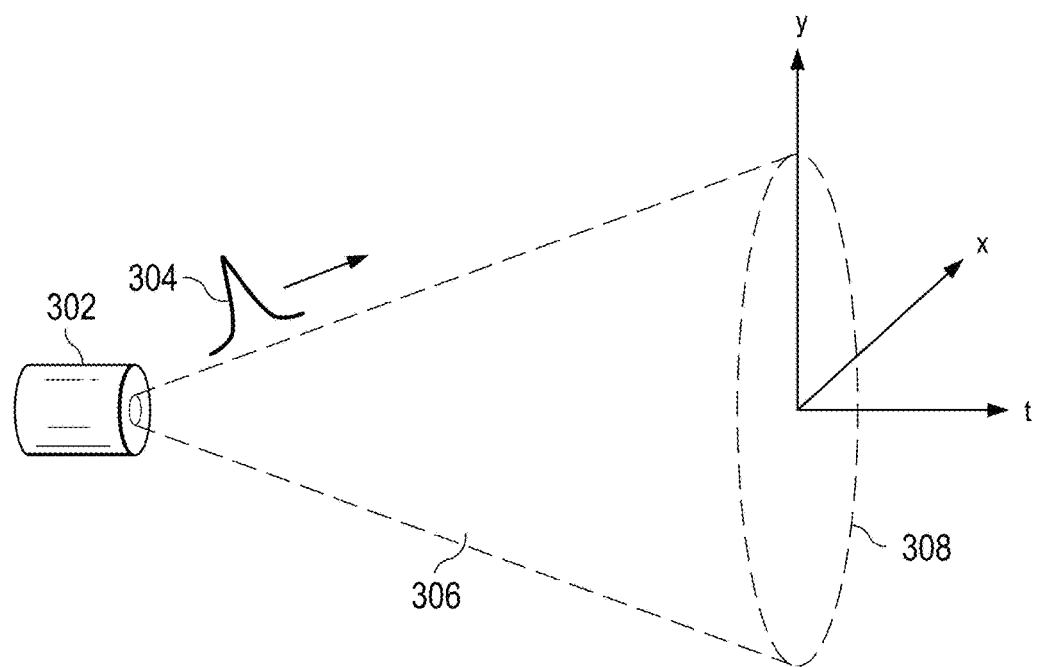
FIG. 3 is a diagram of a beam output by a laser via a short pulse, illustrating beam-widening effects that occur as the beam travels away from the laser.

For example, FIG. 3 illustrates how a short pulse of light 304, output by a laser 302, propagates over time. As shown, the cross-sectional area 306 of the light 304 may expand outwardly along the x and y axes over time. As the light 304 travels away from the laser 302, it may experience various non-idealities such as scattering, beam widening, and dispersion. The effects of such non-idealities on the amplitude of the light 304 in the x, y, and t directions may be defined as respective Gaussian functions. Here, the x and y axes define a plane that is transverse to the vector of propagation of the emitted light 304. The t axis is orthogonal to the transverse plane, is parallel to the vector of propagation of the light 304, and represents both the time and distance traveled by the light 304.

Figure 4:
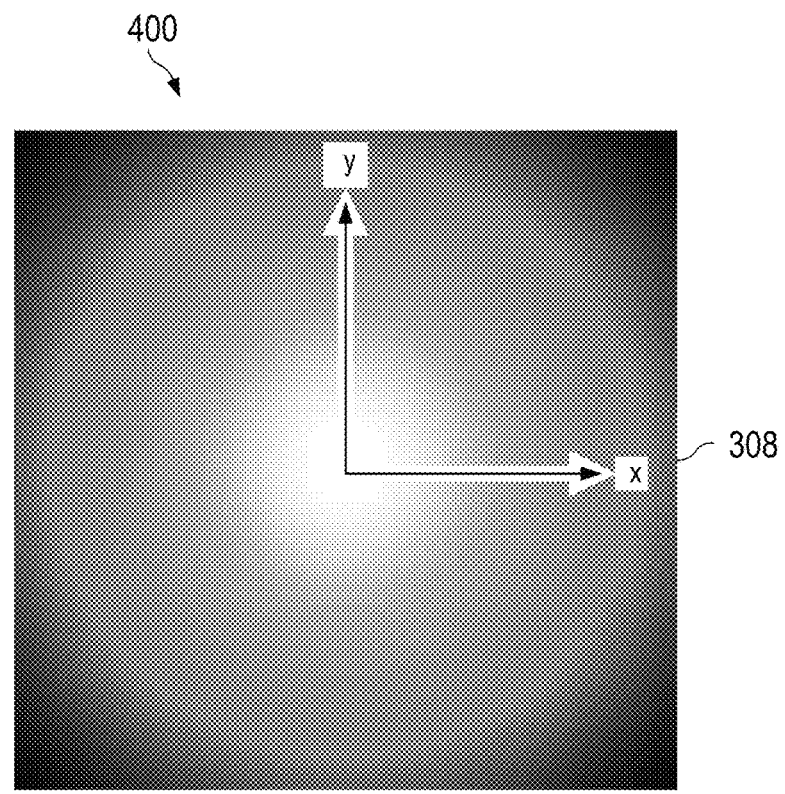
FIG. 4 is a diagram depicting a gaussian spot that is formed by the beam of FIG. 2 when incident upon an object.

For example, the pulse function, denoted here as a vector $v_T$, that defines the amplitude of the light 304 over time may be approximated by a Gaussian function, since it is not exactly localized in time. Additionally, at a given point along its transverse plane, the light 304 may define a Gaussian spot 308. FIG. 4 depicts a chart 400 that illustrates the beam amplitude of the Gaussian spot 308 in the transverse plane. As shown, the amplitude of the light 304 may be approximated along the x and y direction by respective Gaussian functions. The amplitude of the light 304 in the x direction is denoted here as a vector $v_x$, and the amplitude of the light 304 in the y direction is denoted here as $v_y$. Accordingly, the amplitude of the light 304 over three-dimensional space may be approximated according to Equations 1-4:

$$v_t = G(t) \quad \text{EQ. 1}$$

$$v_x = G(x) \quad \text{EQ. 2}$$

$$v_y = G(y) \quad \text{EQ. 3}$$

$$H = v_x \otimes v_y \otimes v_t \quad \text{EQ. 4}$$

where G(t), G(x), and G(y) are Gaussian functions over the t, x, and y axes, respectively, and H is the outer product of the vectors $v_x$, $v_y$, and $v_t$, such that H represents a three-dimensional matrix. Returning to the example of FIG. 1, the light-in-flight engine 112 may simulate non-idealities such as scattering, beam widening, and dispersion (e.g., as demonstrated for the light 304 of FIG. 3) of the quanta of the simulated pulsed wavefront by applying H from Equation 4 as a convolutional operator to the pixels of the depth map associated with the original RGB image to produce an optical simulation output.

Figure 5:
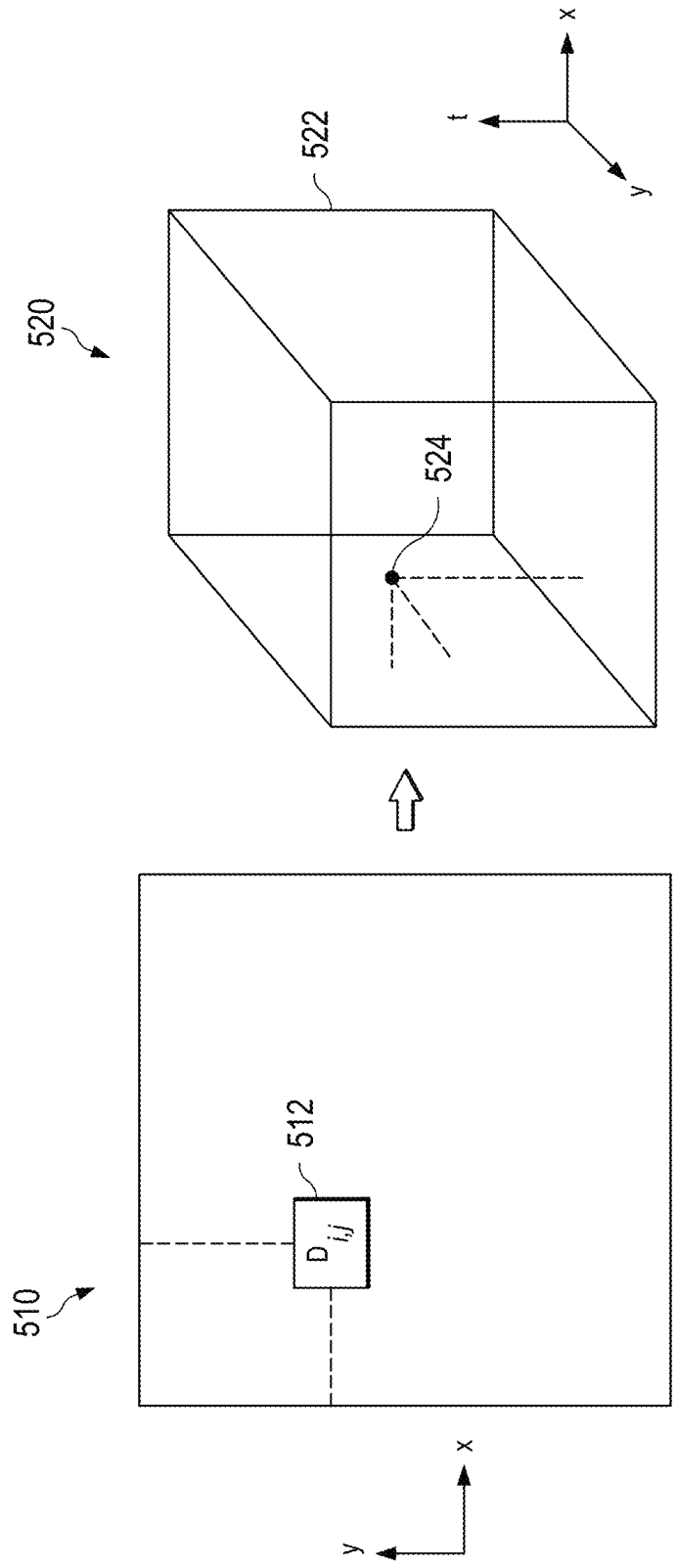
FIG. 5 is a diagram illustrating transformation of a two-dimensional depth map to a three-dimensional lift domain, in accordance with some embodiments.

When generating the optical simulation output for a given RGB image, the light-in-flight engine 112 may transform the RGB image's corresponding depth map into a three-dimensional data structure, such as a cubic data structure, referred to herein as a transform to the "lift domain", in which a pixel is transformed into a voxel having a position in space that is defined with respect to a sparsely populated cube by the original pixel's position in the depth map and the depth value of the original pixel. FIG. 5 shows an example of the transformation of a depth map from a two-dimensional domain to the three-dimensional lift domain. As shown, a two-dimensional depth map 512 initially includes an array of pixels, each defining a respective depth value, $D_{i,j}$, where i and j define the coordinates of a given pixel in the array. In the present example, the light-in-flight engine 112 transforms the depth map 512 to the lift domain, in which the previously two-dimensional depth map 512 is represented as a three-dimensional cubic data structure 520. The cubic data structure 520 is sparsely populated with three-dimensional pixels (i.e., voxels) 524. A subset of the voxels 524 corresponding to the depth of the wavefront at a given timestamp may be referred to herein as "wavefront voxels". Upon transformation to the lift domain, a given voxel's position with respect to the x and y axes is maintained, while the voxel's position along a new third axis, t axis or "time" axis, is determined based on the depth value defined by the corresponding depth map pixel. For example, the depth value of a given pixel divided by the speed of light defines the corresponding voxel's position along the t axis since, as established above, d=c*t. In some embodiments, the third axis may explicitly define depth, rather than time.

Figure 6:
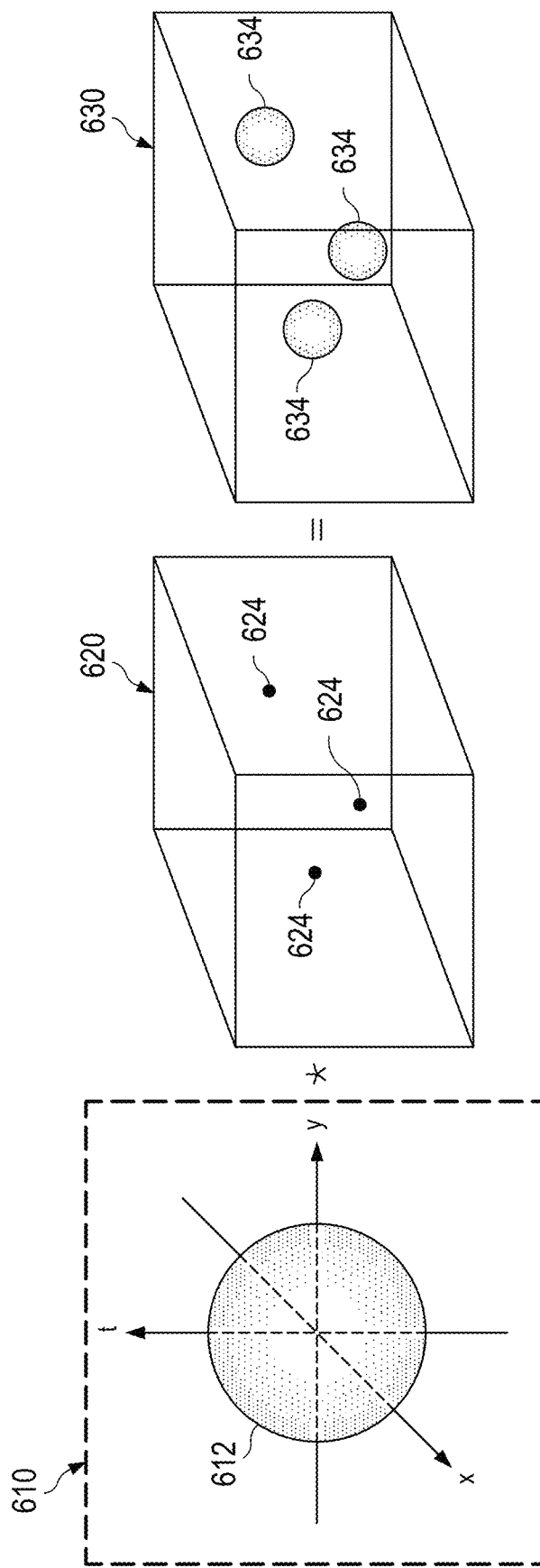
FIG. 6 is a diagram illustrating convolution of a two-dimensional depth map in the lift domain with a convolutional operator that represents the effects of short pulse scattering, beam expansion, and light dispersion, in accordance with some embodiments.

After transforming the depth map to the lift domain, the light-in-flight engine 112 applies the convolutional operator to the voxels of the resultant cubic data structure. FIG. 6 illustrates the application of a convolutional operator 610 to voxels 624 of a cubic data structure 620. The cubic data structure 620 may correspond to a lift-domain transformation of a two-dimensional depth map that corresponding to an RGB image/depth map pair. In the cubic data structure 620, the position of each voxel 624 may be defined by assigning wavefront voxels 624 with a value of 1 or another non-zero value and assigning all other voxels of the cubic data structure 620 a value of zero, for example. The convolutional operator 610 may define a Gaussian sphere 612 corresponding, for example, to the convolutional operator H of Equation 4 and, accordingly, may be defined by respective Gaussian functions along the x, y, and t axes. The light-in-flight engine 112 convolves the convolutional operator 610 with the cubic data structure 620, to produce a filtered cubic data structure 630 that includes Gaussian spheres 634, each centered at the location of a respective one of the voxels 624. For example, the size and amplitude profile of each Gaussian sphere 634 of the cubic data structure 630 may be the same. In some embodiments, the dimensions of the Gaussian sphere 634 along the x, y, and t axes are customizable by a user to achieve different visual effects when simulating the wavefront. By convolving the convolutional operator 610 with the voxels 624 of the cubic data structure 620, the values of voxels around each voxel 624 are increased according to the distributions defined by the Gaussian spheres 634. For example, the amount by which the amplitude of a given non-wavefront voxel is increased depends on its proximity to one or more of the voxels 624, according to distribution(s) of the Gaussian sphere(s) defined by H, with the affected voxels having greater amplitudes the closer they are to the voxels 624. Herein, the filtered cubic data structure 630 is considered the simulation output.

When generating a light-in-flight video, the light-in-flight engine 112 may logically divide the filtered cubic data structure 630 into a number of slices, each centered at a different wavefront depth associated with a respective timestamp (e.g., with each wavefront depth corresponding to the location of the wavefront at the associated timestamp), and each having a width (i.e., along the t axis) corresponding to the diameter of H in the t dimension. It should be understood that the slices may overlap one another along the t axis in some embodiments. The light-in-flight engine 112 may then perform an affine-transform of each slice of the filtered cubic data structure 630 with the original RGB image to generate a sequence of light-in-flight image frames. The light-in-flight engine 112 may then assemble the light-in-flight image frames to produce a light-in-flight video.

For example, returning to FIG. 1, upon generating the optical simulation output, the light-in-flight engine 112 may perform an affine-transform of the original RGB image with slices of the optical simulation output to generate a light-in-flight image. Equation 5 shows an example of the affinetransformations that may be performed by the light-in-flight engine 112 to generate a sequence of light-in-flight images:

$$S(I) = \{I + \alpha Y :, :, k\}_{k=0}^{N-1} \quad \text{EQ. 5}$$
$$= \{I + \alpha(H * X) :, :, k\}_{k=0}^{N-1}$$
$$= \{I + \alpha((H * F(D)) :, :, k\}_{k=0}^{N-1}$$

where S(I) is a set of light-in-flight images output by the light-in-flight engine 112 for an original RGB image, I, D is the depth map corresponding to the original RGB image, Y is the optical simulation output, H is the convolutional operator, X is the cubic data structure corresponding to the depth map, F(D) is the function used to transform the depth map to the lift domain to produce the cubic data structure X, α is a constant that determines the weight assigned to the simulation output (e.g., the amount by which brightnesses of the affected pixels of the original RGB image are increased), k is the index of the sequence of light-in-flight images, and N is the number of light-in-flight images in the sequence. For example, each affine-transformation of the original RGB image performed by the light-in-flight engine 112 effectively adjusts the brightness of pixels in the original RGB image where light from the wavefront would be directly incident (i.e., wavefront pixels) and where scattered light from the wavefront would be incident (i.e., approximated by the convolutional operator used to generate the optical simulation output) for a given timestamp. While Equation 5 indicates the generation of a sequence of light-in-flight images, it should be understood that Equation 5 could also be used to generate a single light-in-flight image.

The light-in-flight engine 112 may be configured to generate a light-in-flight video by generating a sequence of light-in-flight frames (e.g., as provided in connection with Equation 5) simulating motion of the wavefront across the scene depicted in an original RGB image. The speed at which the wavefront is depicted to move across the scene (i.e., the "wavefront speed") in such a light-in-flight video may be predefined, may be defined by a user of the device that executes the light-in-flight image (e.g., the mobile device 100), or may be defined automatically based on a defined time period (e.g., a predefined or user-defined time period for the light-in-flight video). The light-in-flight engine 112 may determine a sequence of timestamps to be used when generating the light-in-flight image frames of the light-in-flight video based on one or more predefined or user-defined timing parameters, which may include the wavefront speed, a desired light-in-flight video length, and/or a predefined sampling rate. In some embodiments, the light-in-flight engine 112 may determine the number of light-in-flight frames to be generated based on the depth of the scene depicted in the RGB image and one or more of the timing parameters. With respect to light-in-flight video, it should be understood that the discrete movement of a wavefront across a scene at the speed of light would generally not be visible to the human eye or reproducible on a conventional display, so the light-in-flight engine 112 may generate the light-in-flight video to simulate movement of the wavefront across the scene at a fraction of the speed at which an actual light wavefront would move or over an expanded time period in order to make the discrete movement of the wavefront perceptible to a viewer. The amount by which the light-in-flight engine 112 modifies the speed of the wavefront or expands the time period in which the wavefront traverses the scene for playback of the light-in-flight video may be selected based on one or more defined timing parameters (e.g., which may be stored in the storage device(s) 110), which may be preset or user defined. For example, the timing parameters may include one or more of: a wavefront speed that defines the speed at which the wavefront is to move in the light-in-flight video, a wavefront time period that defines the time period over which the wavefront is to traverse the scene in the light-in-flight video and which may be defined as the length of the light-in-flight video to be generated, or a frame rate that defines the number of light-in-flight image frames that are to be generated over a given time period of the light-in-flight video.

Figure 7:
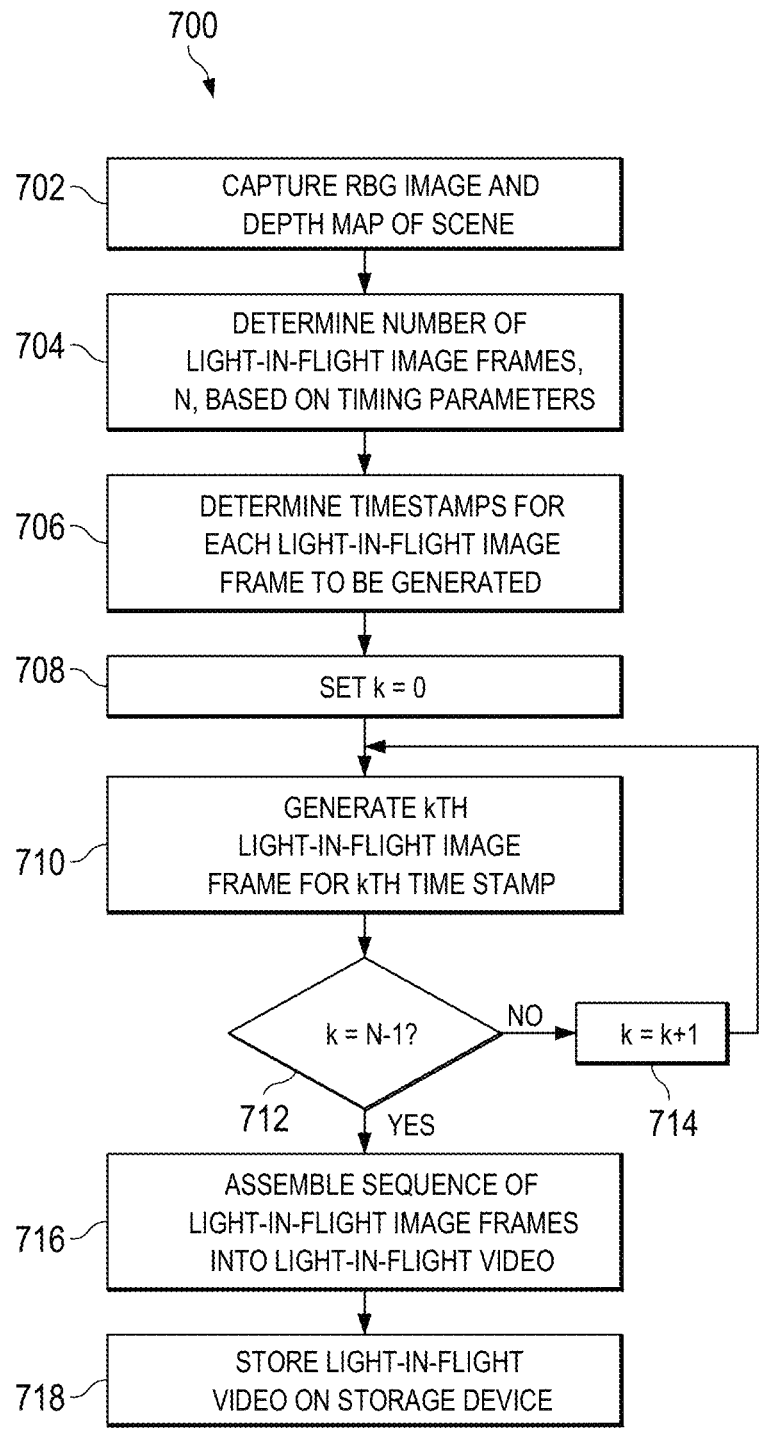
FIG. 7 is a flow diagram of a method of generating light-in-flight video in accordance with some embodiments.

FIG. 7 shows a process flow for a method 700 of generating a light-in-flight video. For example, the method 700 may be performed by a mobile device having an RGB camera and a depth camera. In the present example, the method 700 is described in the context of the mobile device 100 of FIG. 1.

At block 702, an RGB camera 102 and a depth camera 104 of the mobile device 100 capture an RGB image and a corresponding depth map. The RGB image and the depth map may be stored in storage devices 110 of the mobile device 100 for subsequent processing.

At block 704, the light-in-flight engine 112 generates an optical simulation output for the RGB image and the depth map by transforming the depth map pixels to a three-dimensional domain (e.g., cubic data structure), then applying a convolutional operator H to the non-zero voxels of the cubic data structure to produce the optical simulation output (e.g., a filtered cubic data structure).

At block 706, the light-in-flight engine 112 determines the number of light-in-flight image frames, N, to be generated. In some embodiments, the light-in-flight engine 112 determines the number of light-in-flight image frames to be generated based on one or more timing parameters, which may include one or more of wavefront speed, wavefront time period, frame rate, and/or another applicable timing parameter.

At block 708, the light-in-flight engine 112 determines a sequence of timestamps including a respective timestamp for each light-in-flight image frame to be generated, where the timestamp for a given light-in-flight image frame determines the location/depth at which the wavefront is to be simulated in the given light-in-flight image frame. In some embodiments, adjacent timestamps in the sequence may be equally spaced.

At block 710, the light-in-flight engine 112 sets a variable k equal to 1, where k represents the index, with respect to a sequence of frames, of the next light-in-flight image frame to be generated.

At block 712, the light-in-flight engine 112 generates the $k^{th}$ light-in-flight image frame of the sequence, corresponding to the $k^{th}$ timestamp of the sequence of timestamps. For example, the light-in-flight engine 112 may generate each image frame according to blocks 808 and 810 of the method 800 of FIG. 8.

At block 714, the light-in-flight engine 112 determines whether the most recently generated light-in-flight image frame is the last image frame in the sequence of light-in-flight image frames by determining whether k=N−1. If the light-in-flight engine 112 determines that k=N−1, the method 700 proceeds to block 718. Otherwise, if the light-in-flight engine 112 determines that k<N−1, the method 700 proceeds to block 716.

At block 716, the light-in-flight engine 112 increments the value of k by 1. The method 700 then returns to block 712 at which the light-in-flight engine 112 generates the next light-in-flight image frame in the sequence.

At block 718, the light-in-flight engine 112 assembles the sequence of light-in-flight image frames into a light-in-flight video depicting a simulated wavefront travelling across the scene of the RGB image.

At block 720, the light-in-flight engine 112 causes the light-in-flight video to be stored on the storage device 110.

Figure 8:
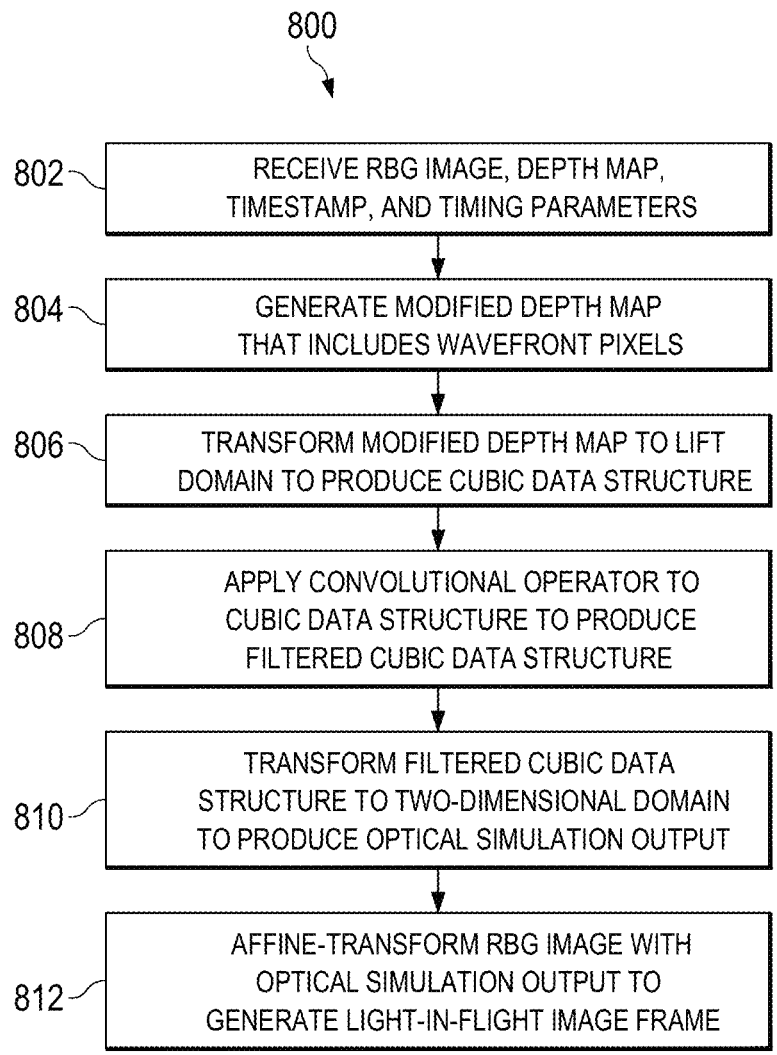
FIG. 8 is a flow diagram of a method of generating a light-in-flight image in accordance with some embodiments.

FIG. 8 shows a process flow for a method 800 of generating a light-in-flight image. For example, some or all of the steps of the method 800 may be performed at blocks 704 and 712 of FIG. 7 when generating the optical simulation output and light-in-flight image frames for light-in-flight images. As another example, the method 800 may be performed to generate a single, stand-alone light-in-flight image. For example, the method 800 may be performed by a mobile device having an RGB camera and a depth camera. In the present example, the method 800 is described in the context of the mobile device 100 of FIG. 1.

At step 802, the light-in-flight engine 112 receives an RGB image, a depth map corresponding to the RGB image, a timestamp, and one or more predefined or user-defined timing parameters. The timestamp defines the time during the traversal of the wavefront across the scene depicted in the RGB image for which the light-in-flight image is to be generated, and the wavefront's location at that time may be derived from the timestamp. The timing parameters may include one or more of wavefront speed, wavefront time period, frame rate, and/or another applicable timing parameter.

At step 804, the light-in-flight engine 112 transforms the depth map to a three dimensional domain. In some embodiments, the light-in-flight engine 112 transforms the depth map to the lift domain to produce a three-dimensional structure, referred to in the present example as a cubic data structure (e.g., the cubic data structure 520 of FIG. 5). The coordinates of a given voxel in the cubic data structure may be selected based on the coordinates of the corresponding pixel of the original depth map and the depth value of the corresponding pixel.

At step 806, the light-in-flight engine 112 applies a convolutional operator (e.g., the convolutional operator H of Equation 4) to the cubic data structure to produce a filtered cubic data structure. For example, the filtered cubic data structure may include one or more Gaussian spheres, each centered at a non-zero voxel of the cubic data structure.

At step 808, the light-in-flight engine 112 identifies a slice of the filtered cubic data structure of the optical simulation output that corresponds to the current timestamp for which the light-in-flight image frame is being generated. For example, the identified slice of the filtered cubic data structure may be a matrix that is a subset of the filtered cubic data structure. The matrix may consist of all voxels filtered cubic data structure within a depth range (i.e., a range of values along the t axis) centered at the depth that corresponds to the current timestamp (i.e., corresponding to the location of the wavefront at the time represented by the timestamp), where the size of the depth range corresponds to the diameter of convolutional operator H in the t direction. At step 812, the light-in-flight engine 112 performs an affine-transform of the original RGB image with the identified slice of the optical simulation output to generate a light-in-flight image frame. For example, the affine-transformation may increase the brightnesses of pixels in the RGB image corresponding to surfaces on which the wavefront is simulated to be incident at the time of the timestamp and may increase the brightnesses of pixels corresponding to surfaces on which scattered light from the wavefront is simulated to be incident at the time of the timestamp.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
generating an optical simulation output that simulates light scattering effects for a simulated wavefront based on an optical image and a depth map that corresponds to the optical image; and
producing a light-in-flight image by adjusting brightnesses of a subset of pixels of the optical image based on the optical simulation output and based on a location of the simulated wavefront at a time corresponding to a defined timestamp.

2. The method of claim 1, wherein generating the optical simulation output comprises:
generating a three-dimensional data structure based on the depth map; and
convolving the three-dimensional data structure with a convolutional operator to generate a filtered three-dimensional data structure.

3. The method of claim 2, wherein generating the three-dimensional data structure comprises:
for a given pixel of the depth map, mapping the given pixel to a respective location of the three-dimensional data structure based on two-dimensional coordinates of the given pixel in the depth map and based on a depth value associated with the given pixel.

4. The method of claim 2, wherein the convolutional operator defines a Gaussian sphere.

5. The method of any of claim 2, further comprising:
identifying a slice comprising a subset of voxels of the filtered three-dimensional data structure centered at a wavefront depth corresponding to the location of the simulated wavefront at the time corresponding to the defined timestamp.

6. The method of claim 5, wherein adjusting the brightnesses of the subset of pixels of the optical image based on the optical simulation output comprises:
performing an affine-transform of the optical image with the identified slice.

7. The method of claim 5, further comprising:
determining the wavefront depth based on the speed of light and based on the time corresponding to the defined timestamp, wherein the wavefront depth is indicative of the location of simulated wavefront in the optical image at the time corresponding to the defined timestamp.

8. A computer program product having instructions stored thereon, the instructions, when executed by a processor, cause the processor to perform the steps of the method of claim 1.

9. A mobile device comprising:
an optical camera configured to capture an optical image;
a depth camera configured to capture a depth map corresponding to the optical image;
at least one processor configured to:
generate an optical simulation output that simulates light scattering effects for a simulated wavefront based on the depth map; and
adjust brightnesses of a subset of pixels of the optical image based on the optical simulation output and based on a location of the simulated wavefront at a time corresponding to a defined timestamp to produce a light-in-flight image.

10. The mobile device of claim 9, wherein, to generate the optical simulation output, the processor is further configured to:
generate a three-dimensional data structure based on the depth map; and
convolve the three-dimensional data structure with a convolutional operator to generate a filtered three-dimensional data structure, wherein the optical simulation output comprises the filtered three-dimensional data structure.

11. The mobile device of claim 10, wherein, to generate the three-dimensional data structure, the processor is configured to:
for a given pixel of the depth map, map the given pixel to a respective location of the three-dimensional data structure based on two-dimensional coordinates of the given pixel in the depth map and based on a depth value associated with the given pixel.

12. The mobile device of claim 10, wherein the convolutional operator defines a Gaussian sphere.

13. The mobile device of any of claim 10, wherein the processor is configured to:
identify a slice comprising a subset of voxels of the filtered three-dimensional data structure centered at a wavefront depth corresponding to the location of the simulated wavefront at the time corresponding to the defined timestamp.

14. The mobile device of claim 13, wherein to adjust the brightnesses of the subset of pixels of the optical image based on the optical simulation output, the processor is configured to:
affine-transforming the optical image with the identified slice to produce the light-in-flight image.

15. The mobile device of claim 13, wherein the processor is further configured to:
determine the wavefront depth based on the speed of light and based on the time corresponding to the defined timestamp, wherein the wavefront depth is indicative of the location of the simulated wavefront in the optical image at the time corresponding to the defined timestamp.

16. A method comprising:
generating a plurality of light-in-flight image frames based on an optical image, a depth map corresponding to the optical image, and one or more timing parameters that define a timing of a movement of a wavefront of a light pulse across a scene depicted in the optical image; and
assembling the plurality of light-in-flight image frames into a light-in-flight video, wherein the light-in-flight video simulates propagation of the wavefront of the light pulse across the scene depicted in the optical image.

17. The method of claim 16, wherein generating a light-in-flight image frame of the plurality of light-in-flight image frames comprises:
generating a three-dimensional data structure based on the depth map;
convolving the three-dimensional data structure with a convolutional operator to generate a filtered three-dimensional data structure; and
adjusting brightnesses of a subset of pixels of the optical image based on an optical simulation output to generate the light-in-flight image frame, wherein the optical simulation output comprises the filtered three-dimensional data structure.

18. The method of claim 17, wherein generating the three-dimensional data structure comprises:
for a given pixel of the depth map, mapping the given pixel to a respective location of the three-dimensional data structure based on two-dimensional coordinates of the given pixel in the depth map and based on a depth value associated with the given pixel.

19. The method of claim 17, wherein the convolutional operator defines a Gaussian sphere.

20. The method of claim 17, wherein generating the light-in-flight image frame of the plurality of light-in-flight image frames further comprises:
identifying a slice comprising a subset of voxels of the filtered three-dimensional data structure centered at a wavefront depth corresponding to a location of the wavefront in the scene depicted in the optical image at a time corresponding to a defined timestamp.

21. The method of claim 20, wherein adjusting the brightnesses of the subset of pixels of the optical image based on the optical simulation output comprises:
affine-transforming the identified slice with the optical simulation output to produce the light-in-flight image frame.

22. The method of claim 20, wherein generating the light-in-flight image frame of the plurality of light-in-flight image frames further comprises:
determining the wavefront depth based on the speed of light and based on a time corresponding to the defined timestamp, wherein the wavefront depth is indicative of the location of the wavefront in the scene depicted in the optical image at the time corresponding to the defined timestamp.

* * * * *